(12) United States Patent
Hedlund et al.

(10) Patent No.: US 12,552,471 B2
(45) Date of Patent: Feb. 17, 2026

(54) REAR SUSPENSION ASSEMBLY FOR A SNOWMOBILE

(71) Applicant: Polaris Industries Inc., Medina, MN (US)

(72) Inventors: Michael A. Hedlund, Roseau, MN (US); Matthew J. Prusak, Salol, MN (US); Joseph P. Wood, Forest Lake, MN (US); Corey D. Omdahl, Roseau, MN (US); Jeremy R. Eichenberger, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 585 days.

(21) Appl. No.: 18/075,894

(22) Filed: Dec. 6, 2022

(65) Prior Publication Data

US 2023/0182832 A1 Jun. 15, 2023

Related U.S. Application Data

(60) Provisional application No. 63/288,927, filed on Dec. 13, 2021.

(51) Int. Cl.
  *B62D 55/108* (2006.01)
  *B62D 55/07* (2006.01)
  (Continued)

(52) U.S. Cl.
  CPC .......... *B62D 55/108* (2013.01); *B62D 55/07* (2013.01); *B62D 55/14* (2013.01); *B62M 27/02* (2013.01);
  (Continued)

(58) Field of Classification Search
  CPC ...... B62D 55/07; B62D 55/14; B62D 55/104; B62D 55/108; B62D 55/305; B62M 27/02; B62M 2027/026; B62M 2027/027
  See application file for complete search history.

(56) References Cited

U.S. PATENT DOCUMENTS

| 4,987,965 | A  | * | 1/1991 | Bourret | B62M 27/02 |
|           |    |   |        |         | 180/9.56   |
| 2006/0185919 | A1 | * | 8/2006 | Hibbert | B62M 27/02 |
|           |    |   |        |         | 180/190    |

(Continued)

FOREIGN PATENT DOCUMENTS

| WO | WO-2014191941 A1 * | 12/2014 | ............ B62M 27/00 |
| WO | WO-2017056057 A2 * | 4/2017 | ............ B62M 27/02 |

*Primary Examiner* — S. Joseph Morano
*Assistant Examiner* — Eva L Comino
(74) *Attorney, Agent, or Firm* — Merchant & Gould P.C.

(57) ABSTRACT

A snowmobile extends along a longitudinal axis and includes a frame, a powertrain coupled to the frame and a track operatively coupled to the powertrain, the track having an upper run and a lower run. The snowmobile includes a rear suspension having at least one slide rail having a hyfax defining a plane, at least one front idler wheel in contact with the lower run of the track, at least one center idler wheel positioned adjacent the at least one front idler wheel, and at least one rear idler wheel positioned adjacent the at least one center idler wheel, and wherein the positioning of the at least center idler wheel is configured such that the at least one rear idler wheel is positioned at an angle relative to the plane having a value that is greater than zero.

25 Claims, 13 Drawing Sheets

(51) Int. Cl.
*B62D 55/14* (2006.01)
*B62M 27/02* (2006.01)
(52) U.S. Cl.
CPC . *B62M 2027/026* (2013.01); *B62M 2027/027* (2013.01)

(56) References Cited

U.S. PATENT DOCUMENTS

| | | | | |
|---|---|---|---|---|
| 2009/0050390 A1* | 2/2009 | Mallette | ............ | B62M 27/02 180/193 |
| 2011/0037312 A1* | 2/2011 | Geraschenko | ....... | B62D 55/104 305/141 |
| 2015/0251727 A1* | 9/2015 | Thibault | ............ | B62M 27/02 180/190 |

* cited by examiner

REAR SUSPENSION ASSEMBLY FOR A SNOWMOBILE

CROSS REFERENCE TO RELATED APPLICATION

This application claims the benefit of U.S. Provisional Patent Application No. 63/288,927, filed Dec. 13, 2021, entitled "Rear Suspension Assembly for a Snowmobile", the contents of which are expressly incorporated by reference herein.

FIELD OF THE DISCLOSURE

The present disclosure relates to snowmobiles and, more particularly, to rear suspension assemblies for snowmobiles.

BACKGROUND OF THE DISCLOSURE

Generally, snowmobiles are available for various applications such as deep snow, high performance, luxury touring, and trail riding, for example. Regardless of the application, certain structural components are common to many snowmobiles. For example, snowmobiles typically include a frame, a track assembly, a powertrain, skis, and at least one suspension system, as are illustrated in any of the following U.S. Pat. Nos. 7,353,898; 7,533,749; 7,694,768; 7,891,454; 7,854,285; 8,127,877; 8,490,731; 8,590,654; 8,944,204; 9,096,289; 9,428,232; and 9,446,810; the complete disclosures of which are expressly incorporated herein by reference.

It is known in the state of the art to bias a rear idler wheel upwards with a biasing element, such as a spring, to increase the ability of the snowmobile to climb up over snow and/or obstacles in reverse. However, when the rear idler wheel is biased upward in this configuration, a rear portion of the track that is in contact with the rear idler wheel extends upward off of the ground and at an angle. The track then loses surface area that is in contact with the ground when the snowmobile is operated in a forward direction, which can decrease at least the towing function of the snowmobile. It is also known in the art to provide a mechanism for manually raising the rear idler wheel at an angle relative to the ground when operating in reverse, and manually lowering the rear idler wheel when operating in a forward direction or to maintain a towing function. However, this requires operator to manually actuate the snowmobile into different configurations when the operating modes are changed and reduces the ease of function of the snowmobile.

As such, there is a need, in particular applications, for the snowmobile to have optimized capabilities for operating in reverse, for example the ability to operate in reverse and climb up over snow and/or obstacles that may be in the pathway of the snowmobile. It additionally may be desired for the snowmobile to be capable of switching operation from a reverse direction to a forward direction and having optimized towing functions and increased contact between a track of the snowmobile with the ground while operating in the forward direction. There remains a need for a snowmobile with optimized performance in both a rearward and forward direction.

SUMMARY OF THE DISCLOSURE

In one embodiment of the present disclosure, a snowmobile extends along a longitudinal axis and includes a frame, a powertrain coupled to the frame, a track operatively coupled to the powertrain for propelling the snowmobile on a ground surface, the track having an upper run and a lower run, and a rear suspension. The rear suspension is positioned generally within the track and includes at least one slide rail defining a plane, at least one front idler wheel in contact with the lower run of the track, at least one center idler wheel positioned adjacent the at least one front idler wheel and in contact with the lower run of the track, and at least one rear idler wheel positioned adjacent the at least one center idler wheel and in contact with the lower run of the track. The at least one center idler wheel is positioned longitudinally between the at least one front idler wheel and the at least one rear idler wheel. The positioning of the at least one center idler wheel is configured such that the at least one rear idler wheels is positioned at an angle relative to the plane having a value that is greater than zero.

According to another embodiment of the present disclosure, a snowmobile extends along a longitudinal axis and includes a frame, a powertrain coupled to the frame, a track operatively coupled to the powertrain for propelling the snowmobile on a ground surface and a rear suspension positioned generally within the track. The rear suspension includes at least one slide rail defining a plane, at least one front idler wheel, at least one center idler wheel positioned longitudinally rearward relative to the at least one front idler wheel, and at least one rear idler wheel positioned longitudinally rearward of the at least one center idler wheel. The at least one center idler wheel includes at least a portion positioned at a vertical height below a vertical height of the plane.

According to another embodiment of the present disclosure, a rear suspension assembly for use with a snowmobile, the snowmobile having an endless track and positioned around the rear suspension assembly, includes at least one slide rail defining a plane, a first bracket operably coupled to a second bracket, at least one front idler wheel coupled to the second bracket, at least one center idler wheel coupled to the first bracket and positioned directly longitudinally rearward of the at least one idler wheel, and at least one rear idler wheel coupled to the first bracket and positioned directly longitudinally rearward of the at least one center idler wheel. The first bracket is rotatably coupled to the second bracket such that the first bracket can rotate clockwise and counter clockwise relative to the second bracket through an angle of rotation defined by an uppermost limit and a lowermost limit; and wherein the at least one center idler wheel and the at least one rear idler wheel rotate with the first bracket due to the coupling of the center idler wheel and the rear idler wheel to the first bracket.

According to another embodiment of the present disclosure, a snowmobile extends along a longitudinal axis and includes a frame, a powertrain coupled to the frame, a track operatively coupled to the powertrain for propelling the snowmobile on a ground surface, the track having an upper run and a lower run, and a rear suspension positioned generally within the track. The rear suspension includes at least one slide rail defining a plane, at least one front idler wheel in contact with the lower run of the track, at least one center idler wheel positioned adjacent the at least one front idler wheel and in contact with the lower run of the track, and at least one rear idler wheel positioned adjacent the at least one center idler wheel, the at least one rear idler wheel coupled with a rear axle. The at least one rear idler wheel has a diameter and a height is defined as the height extending between the rear axle and a lowermost surface of the lower run of the track. The height has a value of at least the diameter of the at least one rear idler wheel.

According to another embodiment of the present disclosure, a snowmobile extends along a longitudinal axis and includes a frame, a powertrain coupled to the frame, a track operatively coupled to the powertrain for propelling the snowmobile on a ground surface, the track having an upper run and a lower run, and a rear suspension positioned generally within the track. The rear suspension includes at least one slide rail defining a plane, at least one center idler wheel positioned in contact with the lower run of the track, a bracket operatively coupled to the at least one center idler wheel, and at least one rear idler wheel positioned adjacent the at least one center idler wheel, in contact with the lower run of the track and operatively coupled to the bracket. The center idler wheel is positioned directly adjacent the at least one rear idler wheel and the positioning of the at least one center idler wheel is configured such that the at least one rear idler wheel is positioned at an angle relative to the plane having a value that is greater than zero.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of the invention(s) disclosed herein will become more readily appreciated as the same becomes better understood by reference to the following detailed description when taken in conjunction with the accompanying drawings.

Figure 1:
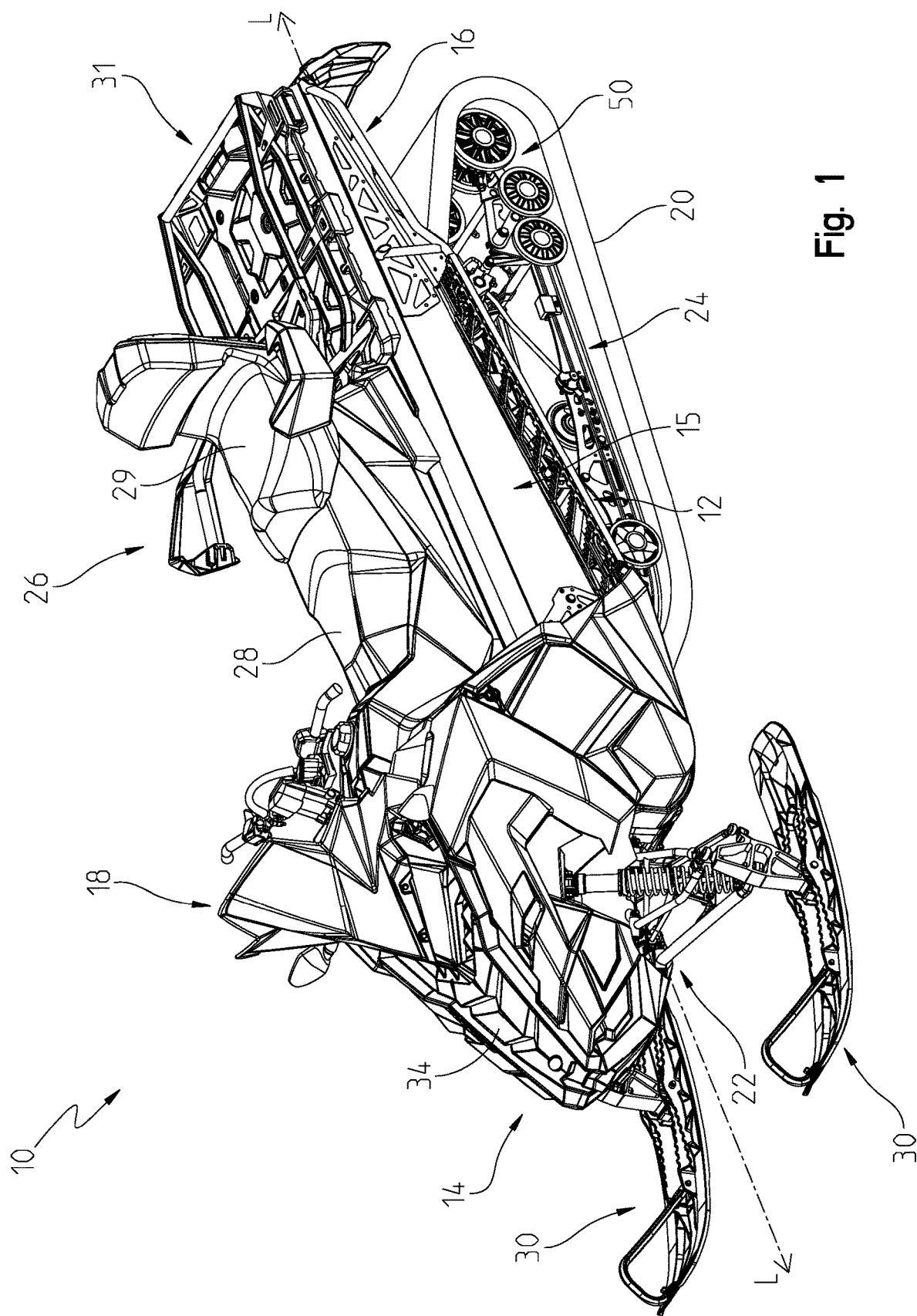
FIG. 1 is a front left perspective view of an illustrative snowmobile of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the disclosure relates to snowmobiles, it is contemplated that the present disclosure is applicable to any tracked vehicle or vehicle that includes a track and, as such, the invention(s) of the present application are not to be limited to snowmobiles.

Referring to FIG. 1, an illustrative embodiment of a snowmobile 10 includes a chassis or frame 12 including a front frame portion 14 and a rear frame portion 16. At least rear frame portion 16 defines a tunnel 15 of snowmobile 10. Snowmobile 10 extends along longitudinal axis L. Front frame portion 14 is supported by front ground-engaging members, illustratively skis 30, and rear frame portion 16 is supported by a rear ground-engaging member, illustratively an endless track 20, configured to be at least partially received within tunnel 15 in the present embodiment. In other embodiments, track 20 may not extend within tunnel 15 and/or snowmobile 10 may not include a tunnel 15 as shown herein. Skis 30 are operably coupled to a front suspension assembly 22, and endless track 20 is operably coupled to a rear suspension assembly 24 and generally surrounds or entrains rear suspension assembly 24.

Snowmobile 10 also includes a seat assembly 26 including an operator's seat 28. In various embodiments, a passenger seat 29 may be included on snowmobile 10, as well. A rear rack assembly 31 is positioned rearwardly of the operator's seat 28 (and at least partially rearward of passenger seat 29 if included on snowmobile 10) and is coupled to the rear frame portion 16. The operator also uses a steering assembly 18, which in combination with front suspension assembly 22, controls the movement of snowmobile 10, specifically the movement of skis 30. Illustratively, steering assembly 18 is a handlebar assembly, however, steering assembly may include any type of operator input, such as a steering wheel.

Snowmobile 10 further includes a powertrain unit (not shown) generally concealed at least partially by an outer body 34 of snowmobile 10. The powertrain unit provides power to endless track 20 to move snowmobile 10. Various components of the powertrain unit may be supported by front frame portion 14 such as an engine (not shown) and a transmission (not shown). Additionally, while snowmobile 10 described throughout comprises a constant length and width, the size and shape of snowmobile 10 may vary.

Figure 2:
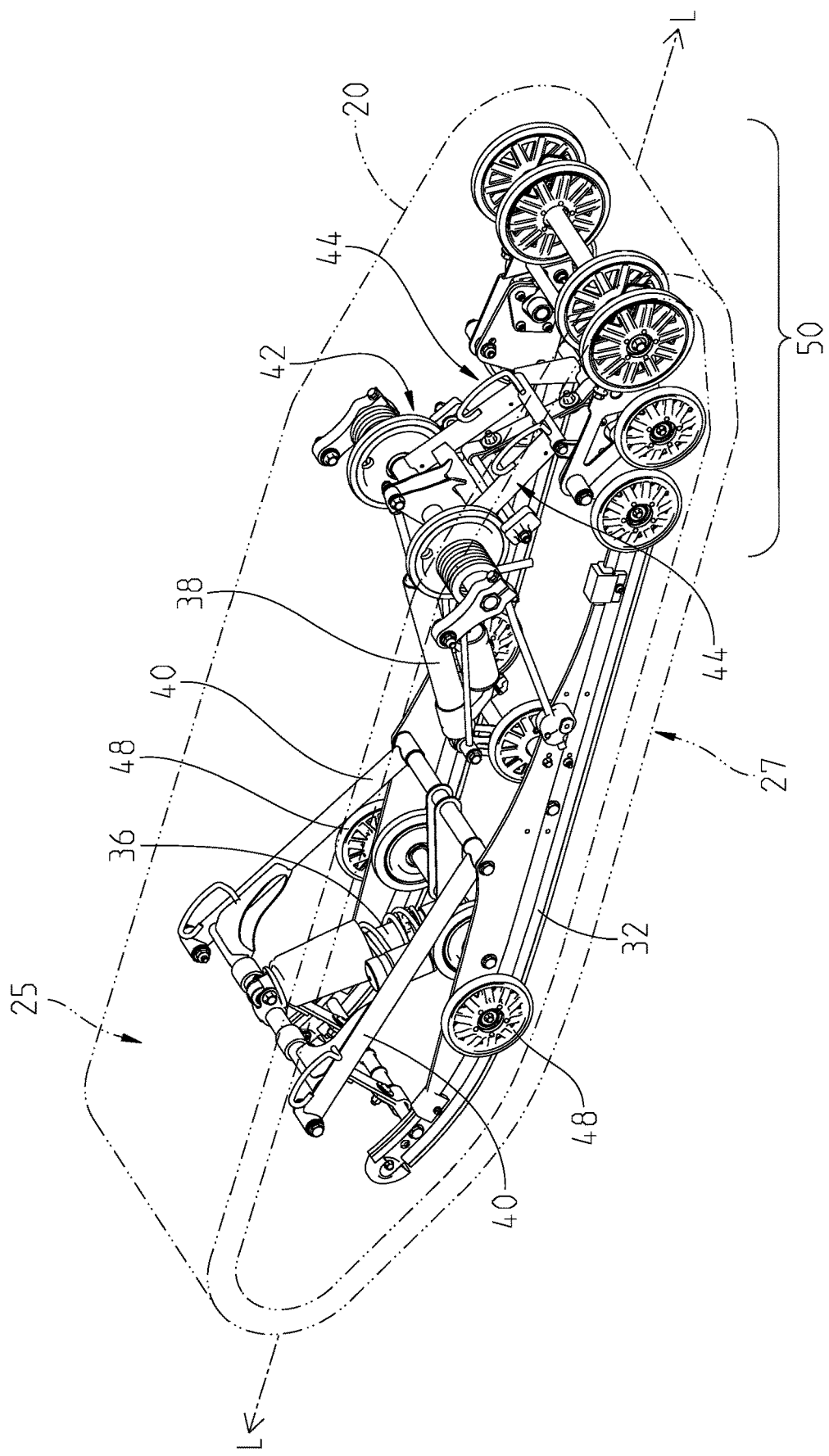
FIG. 2 is a rear left perspective view of a track and rear suspension for the snowmobile of FIG. 1.
Figure 3:
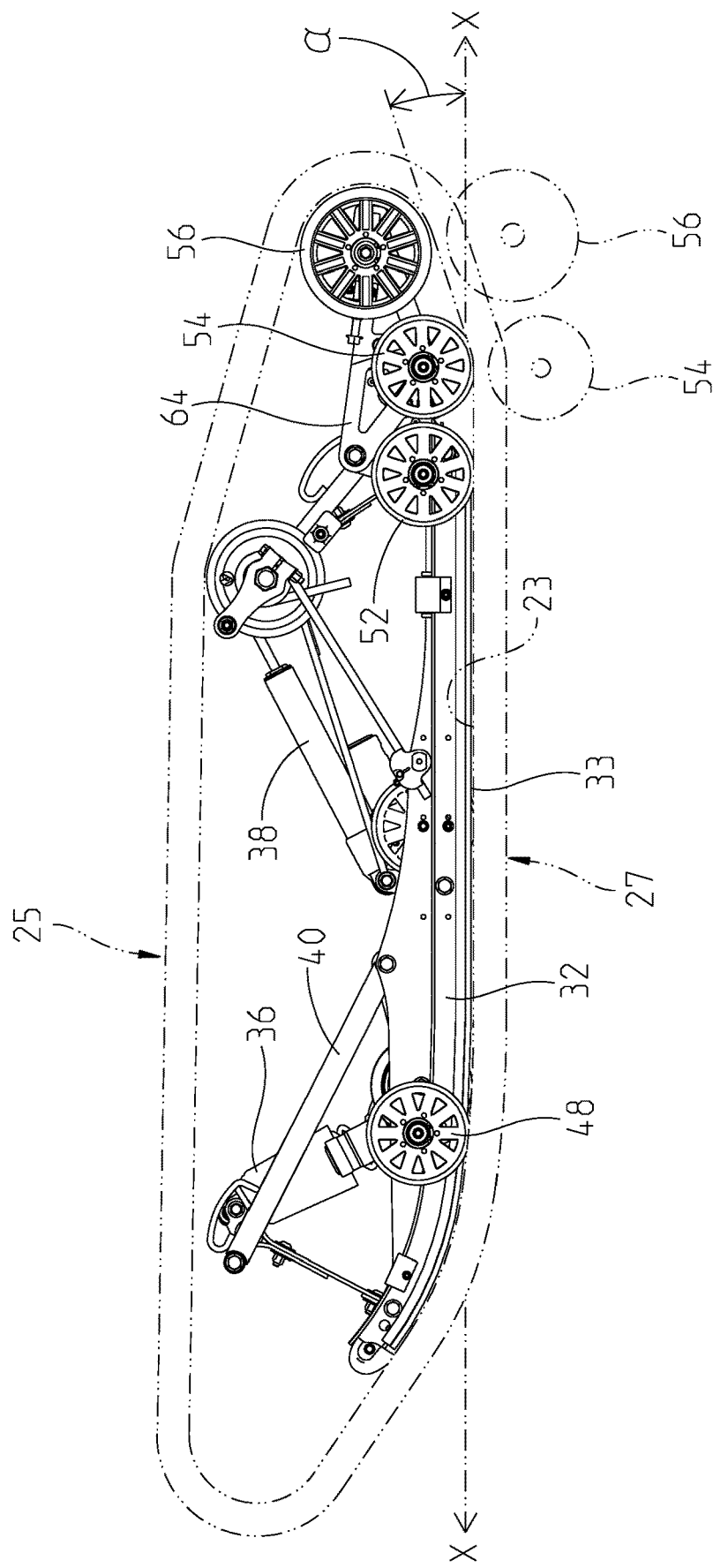
FIG. 3 is a left side view of the track and rear suspension of FIG. 2.
Figure 4:
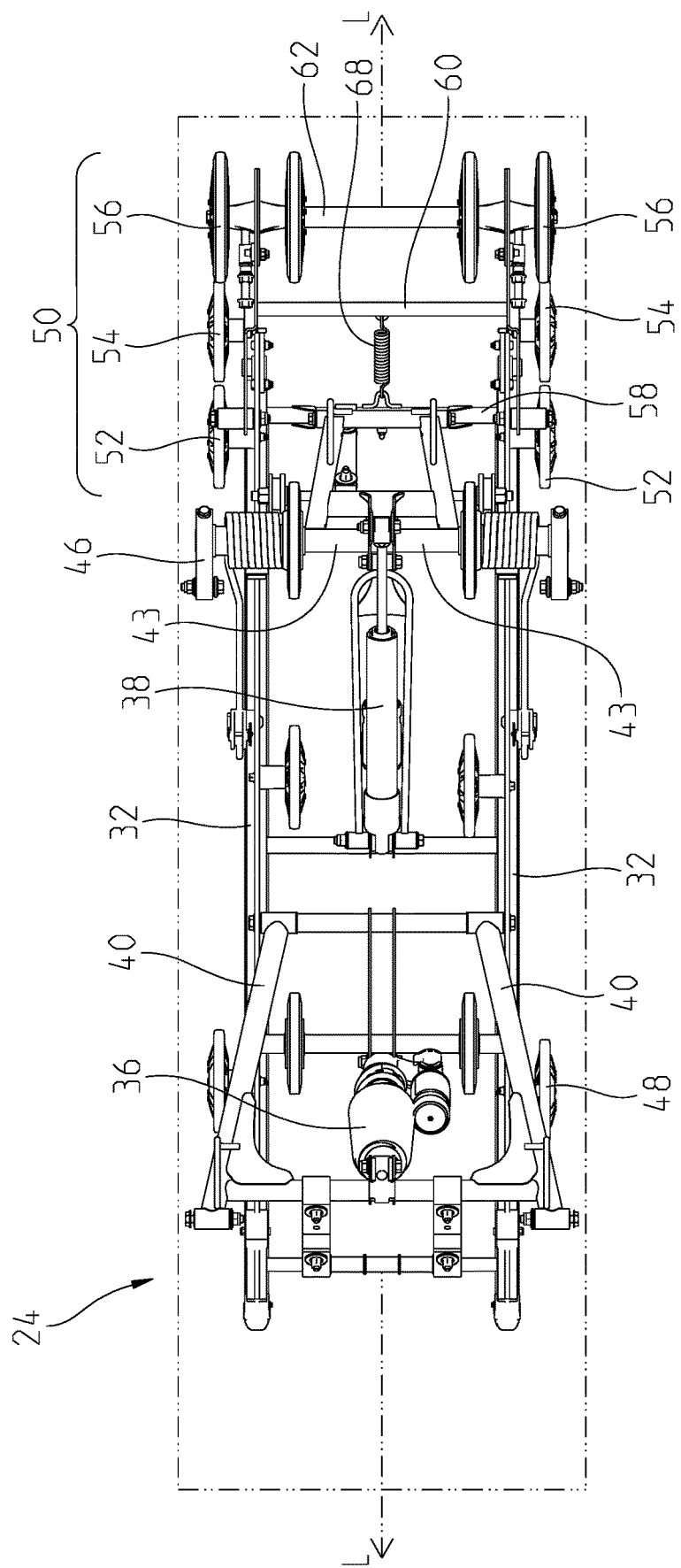
FIG. 4 is a top view of the track and rear suspension of FIG. 2.

With reference now to FIGS. 2-4, endless track 20 and rear suspension assembly 24 of snowmobile 10 are described in further detail. FIG. 2 illustrates endless track 20 in phantom line positioned around rear suspension assembly 24 of snowmobile 10. Rear suspension assembly 24 is configured to cooperate with endless track 20 when snowmobile 10 is operating. In particular, various components of rear suspension assembly 24 are configured to move at least partially longitudinally and/or vertically during operation of snowmobile 10 while endless track 20 propels endless track 20 forward or in reverse. With specific reference to FIG. 3, endless track 20 comprises an upper run or portion 25 and a lower run or portion 27 in contact with a ground positioned directly below snowmobile 10 during use such that endless track 20 moves across the ground when propelled by the powertrain unit. Upper run 25 is positioned generally above rear suspension assembly 24 and lower run 27 is positioned generally below rear suspension assembly 24. It may be appreciated that endless track 20 is configured to rotate around rear suspension assembly 24 such that any portion of track 20 is configured to define upper and lower runs 25, 27, depending on the position of that portion of track 20 relative to rear suspension assembly 24 and the ground.

Rear suspension assembly 24 includes a plurality of slide rails 32. More particularly, the plurality of slide rails 32 includes a left slide rail 32 and a right slide rail 32. Each of the plurality of slide rails 32 comprise a lowermost surface 33 and a hyfax, or a plastic strip, positioned along lowermost surface 33 of slide rails 32. The hyfax of each slide rail 32 defines a plane X. In the illustrative embodiments of FIGS. 1-3, plane X is nominally parallel with longitudinal axis L of snowmobile 10 (FIG. 1).

Rear suspension assembly 24 also includes a front linear force element, such as a shock absorber 36, positioned inside an interior or envelope of endless track 20, a rear linear force element, such as a shock absorber 38, also positioned within the interior of endless track 20, and a plurality of torque or control arms 40 operably coupled to slide rails 32, front shock absorber 36, and/or rear shock absorber 38. In some embodiments, torque arms 40 may be comprised of forged aluminum, which may reduce the overall weight of snowmobile 10.

Rear suspension assembly 24 also includes at least two front idler wheels 48, at least two carrier wheels 42, a plurality of rear suspension idler wheels 50, and a link assembly 44 operatively coupling the at least two carrier wheels 42 and the plurality of rear suspension idler wheels 50. Carrier wheels 42 are connected to one another through a carrier axle 43 (FIG. 4), wherein carrier axle 43 defines the axis of rotation of carrier wheels 42. Illustratively, carrier wheels 42 are positioned generally adjacent the upper run of track 20 and, as such, are positioned at a vertical height greater than that of at least some of idler wheels 50.

The plurality of rear suspension idler wheels 50 includes at least two first or front idler wheels 52, at least two second or center idler wheels 54, and at least two third or rear idler wheels 56. More particularly, left side rail 32 and right slide rail 32 each includes one front idler wheel 52, one center idler wheel 54, and one and more rear idler wheel 56 such that the right and left side slide rails 32 define a right and left pair thereof, front idler wheels 52 define a right and left pair thereof, center idler wheels 54 define a right and left pair thereof, and rear idler wheels 56 define at least a right and left pair (or more) thereof. In the illustrative embodiments herein, rear idler wheels 56 includes four rear idler wheels 56, which illustratively, is shown as a pair of right rear idler wheels 56 and a pair of left rear idler wheels 56. However, other amounts of rear idler wheels 56 may be incorporated. Further, while the plurality of rear suspension idler wheels 50 is illustrated as including front idler wheels 52, in various embodiments the plurality of rear suspension idler wheels 50 may not incorporate front idler wheels 52. In these embodiments, which will be described further herein with reference to FIGS. 8A and 9B, the plurality of rear suspension idler wheels 50 may include at least one center idler wheel 54 and at least one rear idler wheel 56.

With reference again to FIGS. 2-4, for each slide rail 32, front idler wheel 52, center idler wheel 54, and at least two of rear idler wheels 56 are longitudinally aligned with one another such that front idler wheel 52 is positioned directly forward of center idler wheel 54 and rear idler wheels 56. As such, center idler wheels 54 are positioned immediately adjacent rear idler wheels 56. Front idler wheels 52 and center idler wheels 54 may be positioned in contact with the lower run of endless track 20. In other words, front and center idler wheels 52, 54 are positioned such that a lowermost portion of front and center idler wheels 52, 54 are positioned at a vertical height approximately equal to a vertical height of lowermost surface 33 of slide rail 32. Said another way, the lowermost portion of idler wheels 52, 54 are positioned at approximately the same vertical height of an uppermost surface 23 of the lower run of endless track 20. In these embodiments, the lowermost portion of front and center idler wheels 52, 54 may be vertically aligned, as well as longitudinally aligned with each other.

In other embodiments, as illustrated in phantom in FIG. 3, the lowermost portion of each of center idler wheels 54 may be positioned below plane X to allow for increased traction when snowmobile 10 traverses uneven terrain, for example bumps and holes in the ground. When each of center idler wheels 54 is positioned below plane X, the lowermost portion of each of rear idler wheels 56 may also be positioned at a lower vertical height in comparison to that shown in FIG. 2. This lower vertical positioning is also shown in phantom in FIG. 3. For example, in some embodiments, rear idler wheels 56 may be positioned at a vertical height equal to that of plane X or at an angle relative to plane X of less than zero degrees. This provides the benefit of rear idler wheels 56 being capable of pivoting upwards to a greater vertical height than may be possible otherwise, as the space between rear idler wheels 56 and the upper most limit defined by the positioning of tunnel 15 of snowmobile 10 may be increased. In other words, center idler wheels 54 are configured to move vertically relative to plane X, including moving vertically below plane X, to accommodate various terrain and movement of snowmobile 10. In these embodiments, rear idler wheels 56 may move vertically below plane X as well. Illustratively, rear idler wheels 56 are positioned at a vertical position that is higher than a vertical position of front and center rear idler wheels 52, 54 and angled relative to plane X to increase the ease of which that snowmobile 10 operates in reverse, as will be described further with reference to FIGS. 7-9. More particular, the axis of rotation of rear idler wheel 56 is generally positioned at a vertical height greater than the axis of rotation of idler wheels 52, 54.

Figure 5:
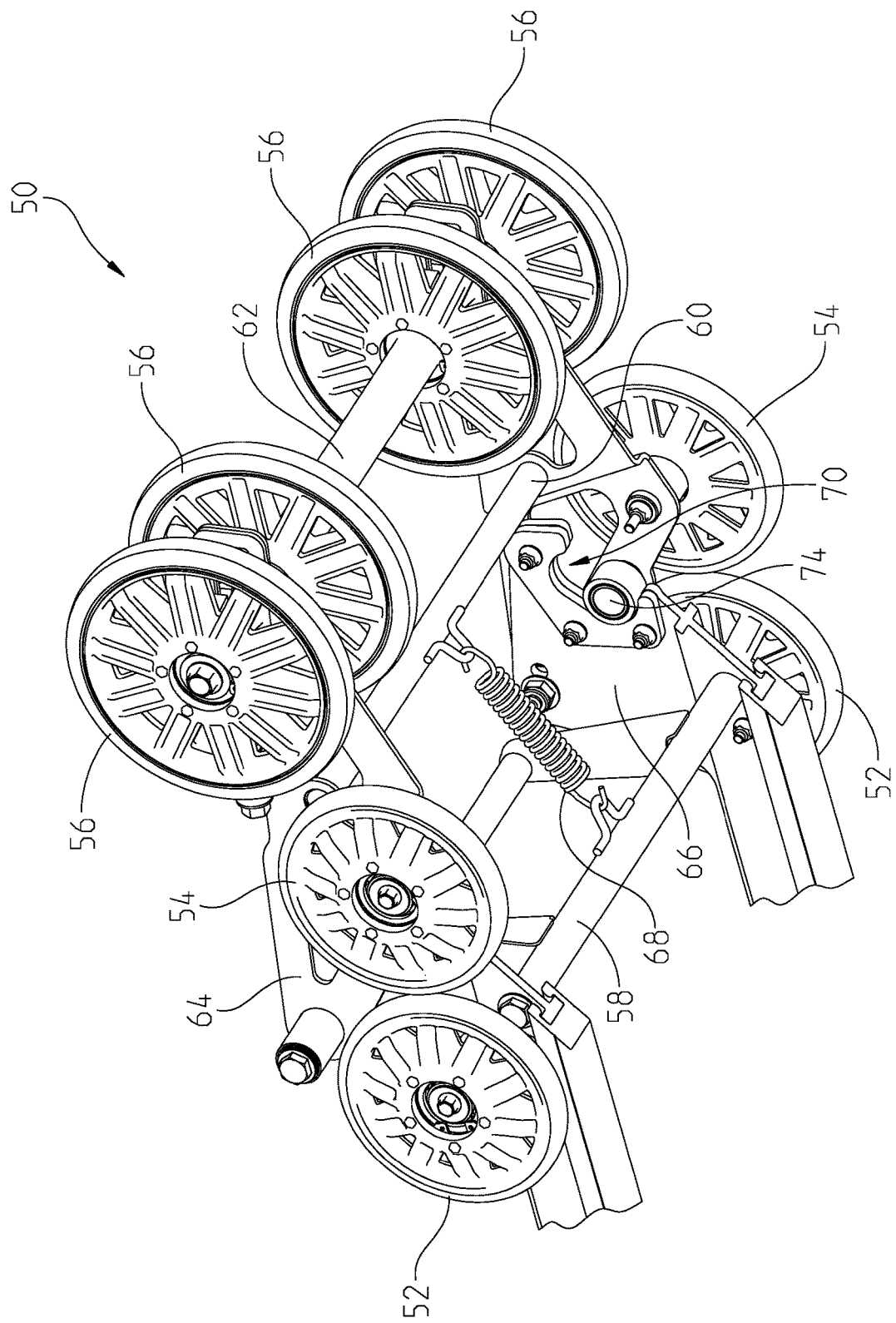
FIG. 5 is a left rear perspective view of a portion of a rear suspension of the snowmobile of FIG. 1.
Figure 6:
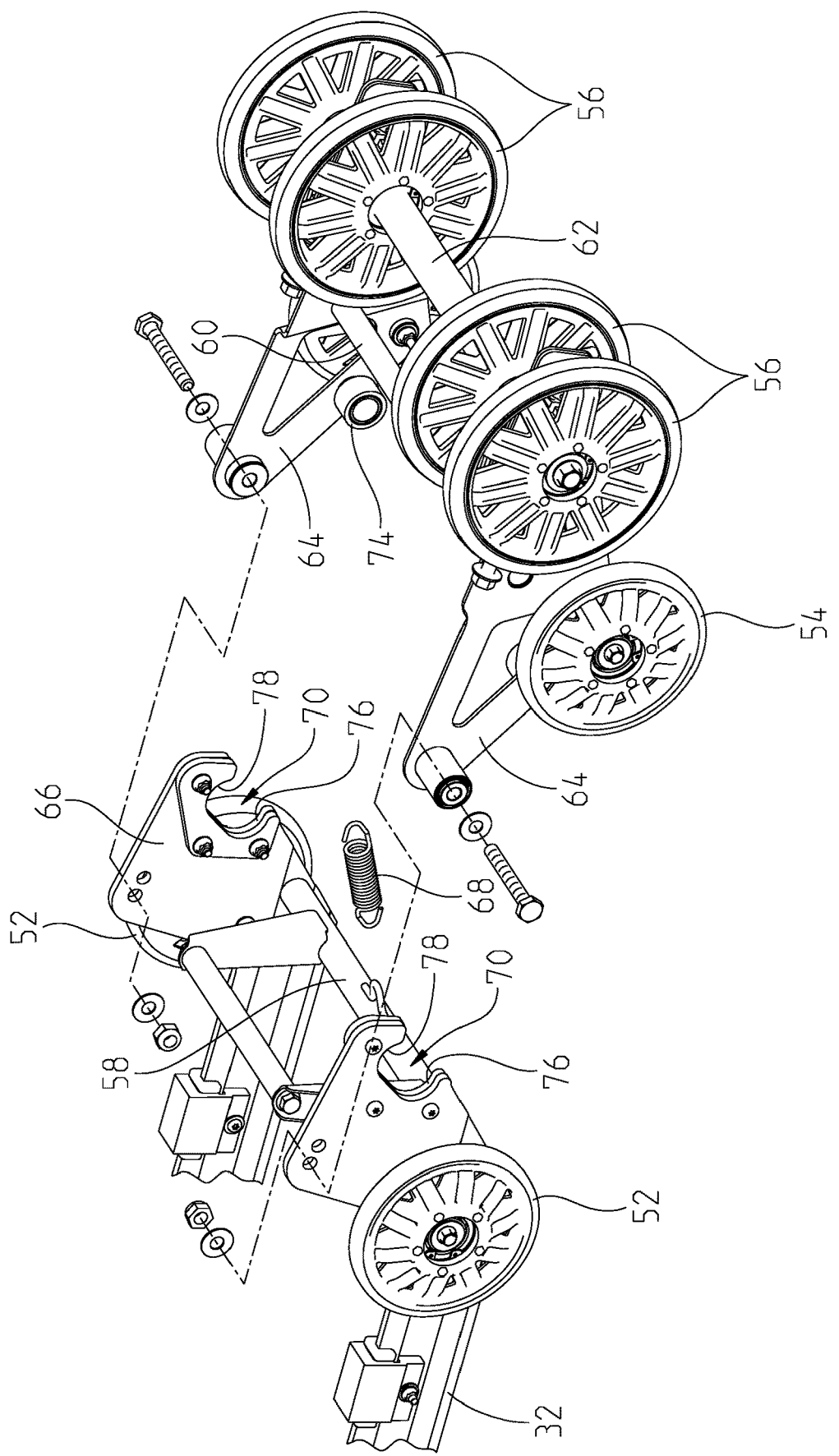
FIG. 6 is an exploded view of the portion of the rear suspension of FIG. 5.

With reference particularly to FIGS. 5 and 6, the assembly and configuration of the plurality of rear suspension idler wheels 50 will be described in further detail. As illustrated in FIGS. 5 and 6, front idler wheels 52 are coupled to one another with a first axle 58. However, as will be disclosed further with reference to FIGS. 8A and 9A, in various embodiments front idler wheels 52 and first axle 58 may not be incorporated in rear suspension assembly 24. Rear idler wheels 56 are coupled to one another with a second rear axle 62 and operatively coupled to at least two first brackets 64. Center idler wheels 54 are coupled to each of first brackets 64, and a transverse tube 60 extends between first brackets 64 for coupling together first brackets 64. In this way, center idler wheels 54, rear idler wheels 56 and second rear axle 62 are operatively coupled to one another.

Figure 8:
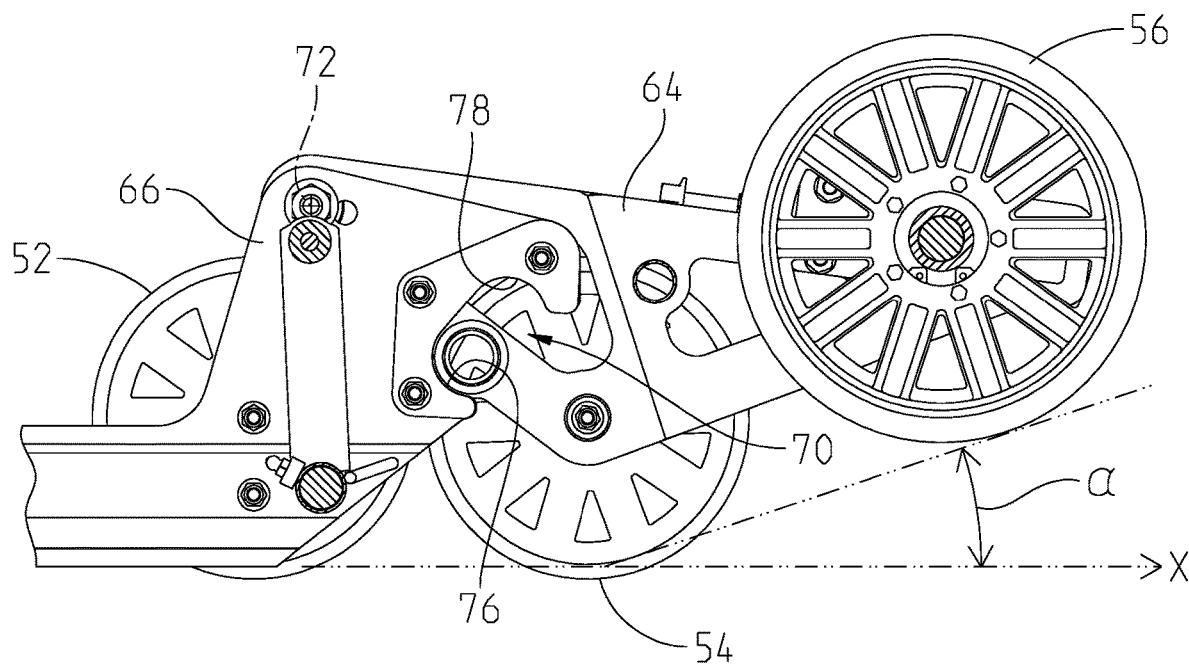
FIG. 8 is a left side view of a right side of the rear suspension of FIG. 5 and showing an inner side of the portion of the right side of the rear suspension of FIG. 5 in a first configuration.
Figure 9:
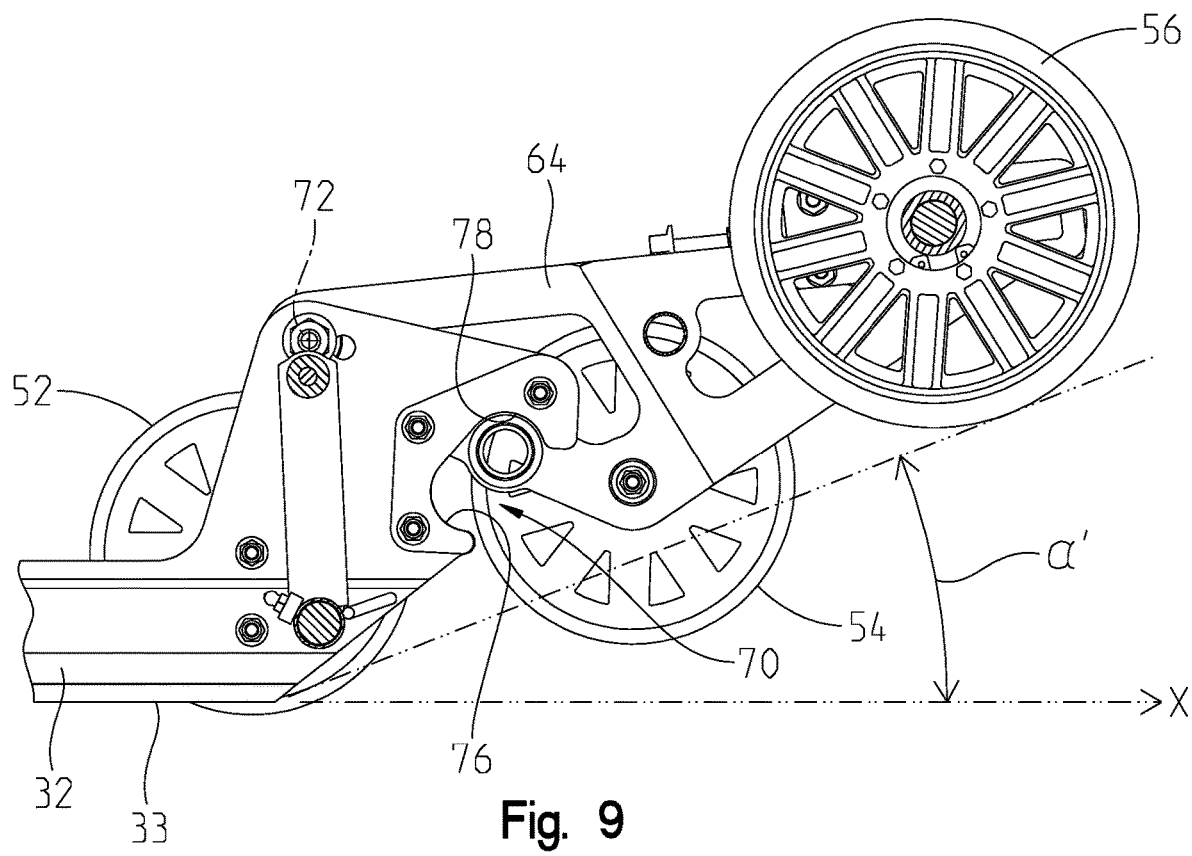
FIG. 9 is a left side view of the right side of the rear suspension of FIG. 8 and showing the inner side of the portion of the right side of the rear suspension of FIG. 5 in a second configuration.

With reference again to FIGS. 5 and 6, first axle 58 coupling together front idler wheels 52 extends through at least two second brackets 66 that are operatively coupled to first brackets 64. In this way, front idler wheels 52, center idler wheels 54, and rear idler wheels 56 are operatively coupled with one another. Additionally, first brackets 64 are rotatably coupled to second brackets 66 through fasteners, for example nuts and bolts, however various other suitable fastening means may be used for a rotational coupling. As such, first brackets 64 are capable of rotation about a pivot point 72 (FIGS. 8 and 9). Specifically, as illustrated in FIGS. 5 and 6, each second bracket 66 comprises a channel 70 for receiving a pin 74 that is coupled to each first bracket 64. Further, each channel has a lowermost surface 76 and an uppermost surface 78. In the configurations of FIGS. 5-6, pin 74 is positioned against lowermost surface 76 of channel 70. Upon rotation of the first brackets 64, pin 74 of first bracket 64 is able to pivot between lowermost surface 76 and uppermost surface 78. As pins 74 are fixed to brackets 64, and center and rear wheels 54, 56 are coupled with brackets 64, rotation of pins 74 and first brackets 64 cause rotation of center and rear wheels 54, 56. In this way, when brackets 64 pivot or rotate based on a change in the forces acting against various portions or components of rear suspension assembly 24, center idler wheels 54 and rear idler wheels 56 may pivot and/or be otherwise displaced vertically and/or longitudinally to adjust the desired position and angle of rear idler wheels 56 relative to plane X (FIG. 3). The rotation of brackets 64 will be described further herein with reference to FIGS. 8-9. Additionally, as described previously, center idler wheels 54 may each be positioned above, at, or below plane X, and the size of channel 70 may be configured to allow for this vertical positioning. In various other embodiments, center idler wheels 54 do not rotate upwards (or downwards) with first brackets 64 and only rear idler wheels 56 rotate upwards (or downwards).

First brackets 64 are capable of rotation through an angle of rotation defined by an upper limit and a lower limit. The upper limit is defined by the positioning of tunnel 15 (FIG. 1), such that pivoting of first brackets 64, and thus rear idler wheels 56, too far upwardly towards tunnel 15 can cause compression of rear suspension assembly 24 against tunnel 15 and impede function of rear suspension assembly 24. The lower limit of rotation is defined by a longitudinal distance between front idler wheels 52 and center idler wheels 54 because rotation of first brackets 64, and thus rear idler wheels 56 and center idler wheels 54, downwardly may cause contact between center idler wheels 54 and front idler wheels 52, thereby impeding function of front and center idler wheels 52, 54. In this way, first brackets 64 may act as an articulation arm that facilitates rotation of rear idler wheels 56 and center idler wheels 54 based on the rotation of first brackets 64 about each pivot point 72.

With continued reference to FIGS. 5-6, in some embodiments, rear suspension assembly 24 includes a biasing element, for example a spring 68, that extends between transverse tube 60 and first axle 58. Through this configuration, spring 68 exerts a downward biasing force onto first brackets 64, and thus, onto at least center rear idlers 54, as will be described further herein with reference to FIGS. 7-9. Incorporating spring 68 may increase the stability of rear suspension assembly 24, thereby increasing the stability of snowmobile 10. Increased stability of snowmobile 10 may increase the comfort of the operator and/or passenger(s) during use. While the embodiment herein illustrates the use of spring 68, in other embodiments, other biasing elements may be incorporated. In further embodiments, a biasing element such as spring 68 is not incorporated into the rear suspension assembly 24.

Figure 7:
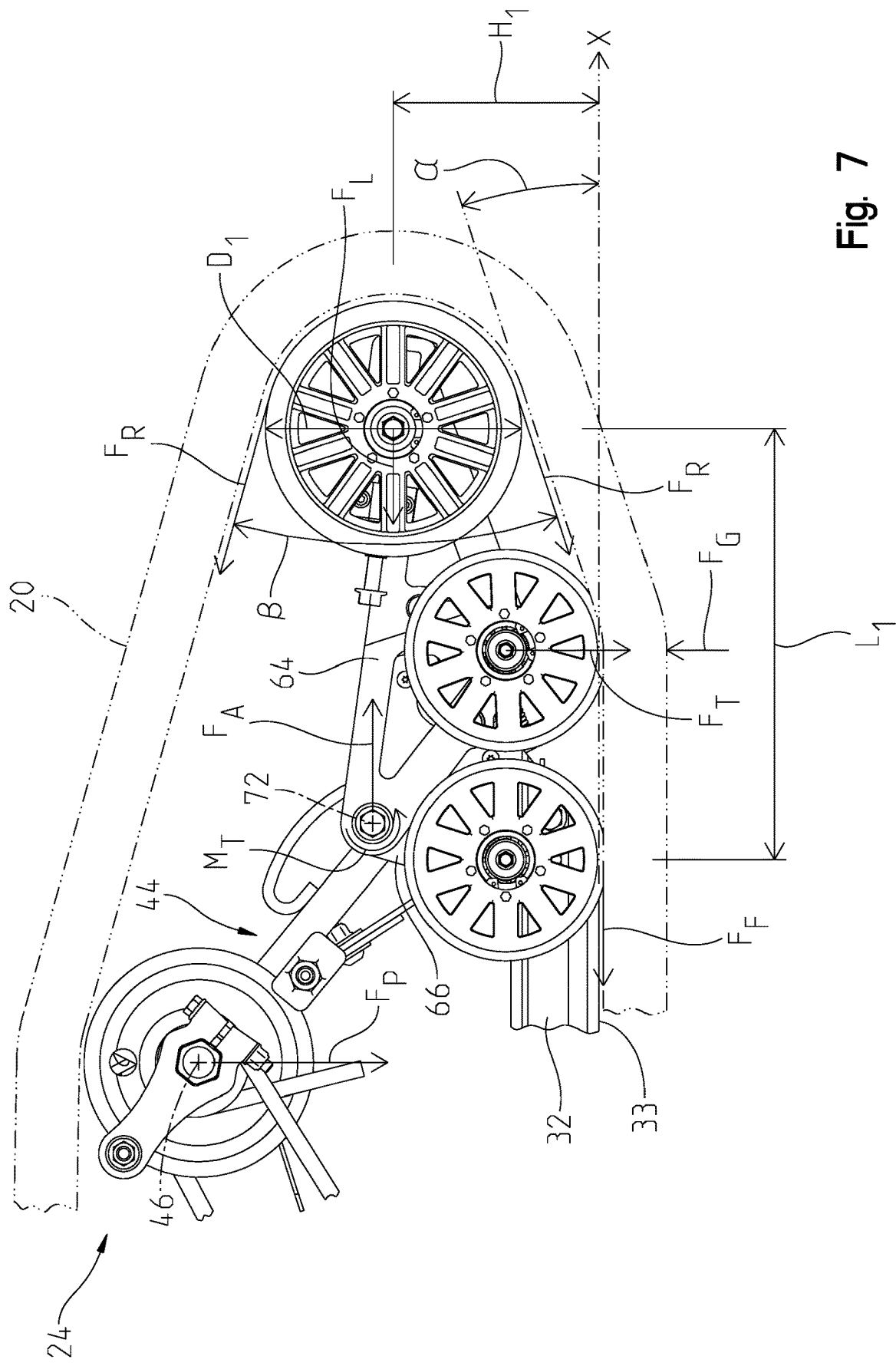
FIG. 7 is a left side view of the portion of the rear suspension of FIG. 5.

FIG. 7 illustrates a side view of a portion of rear suspension assembly 24. The angle of rear idler wheels 56 relative to plane X and the forces exerted onto and by elements of rear suspension assembly 24 that facilitate this positioning of rear idler wheels 56 will be described further in detail herein. As previously disclosed, rear idler wheels 56 are at an angled position relative to plane X. More specifically, a lowermost surface of each of rear idler wheels 56 is angled relative to plane X at angle α. In other words, a tangent line extending from the lowermost surface of each of rear idler wheels 56 is angled relative to plane X by angle α. In some embodiments, angle α has a value that is less than zero degrees, for example when central idler wheels 54 and rear idler wheels 56 are positioned below plane X. For example, angle α may have a value of approximately −5 degrees. In other embodiments, angle α has a value ranging between approximately 0 degrees and approximately 50 degrees. For example, angle α may have a value of approximately 9 degrees. In other examples, angle α has a value of approximately 16 degrees. In further examples, angle α has a value of approximately 24 degrees. In these embodiments, rear idler wheels 56 maintain positioning at angle α relative to plane X without additional manual actuation from the operator or a need to adjust components of rear suspension assembly 24 during operation.

The positioning of rear idler wheels 56 at angle α relative to plane X has at least the advantage of allowing for an increased performance of snowmobile 10 when operating in reverse by maintaining an angle that keeps track 20 in contact with the ground/snow. For example, as rear idler wheels 56 are already positioned with angle α relative to plane X when the operator starts to operate in reverse, snowmobile 10 is better configured to climb up and over any snow or obstacle positioned rearward of snowmobile 10 as opposed to if rear idler wheels 56 were positioned downward and parallel with plane X. Positioning of rear idler wheels 56 at angle α allows for engagement of rear idler wheels 56 with the snow at a higher point than it would otherwise. As a result, the need for manually repositioning rear idler wheels 56 is eliminated. However, in various embodiments, snowmobile 10 may comprise additional accessories at a rear end of snowmobile 10 or for rear suspension assembly 24 that may benefit from manual adjustment prior to movement in reverse. In some embodiments, the value of angle α varies while snowmobile 10 is operated in reverse. For example, the passage over snow or other obstacles may increase the upward forces on various of the components of rear suspension assembly 24, as will be described further, and cause angle α to increase.

Additionally, with continued reference to FIG. 7, the positioning of rear idler wheels 56 is defined by the ratio between the height of a center point of rear idlers wheels 56, or the height of second rear axle 62, and a diameter D1 of rear idler wheels 56. A height H1 is defined as a height extending from plane X, to second rear axle 62 of rear idler wheels 56. In some embodiments, height H1 may have a value at least equal to diameter D1 of rear idler wheels 56. In other embodiments, height H1 may have a value of more than 1 times the value of diameter D1 of rear idler wheels 56, for example twice the value of diameter D1. Achieving a greater value of the height H1 relative to diameter D1 of rear idler wheels 56 may be beneficial for the ability of snowmobile 10 to reverse and climb over snow or various other objects, as previously described with reference to angle α. For example, if rear idler wheels 56 are positioned at a greater height H1 relative to diameter D1, when snowmobile 10 encounters an obstacle, rear idler wheels 56 may have a greater ability to pivot further upwards and climb over the obstacles. Additionally, by maintaining a ratio of height H1 relative to diameter D1, diameter D1 may be adjusted while still maintaining the optimized ability for rear idler wheels 56 to climb over obstacles and/or snow while operating in reverse.

Further, the configuration of center idler wheels 54 largely contributes to the ability of rear idler wheels 56 to be angled relative to plane X, while front idler wheels 52 can maintain contact with endless track 20 to maintain optimized contact between endless track 20 and the ground beneath snowmobile 10. Rear idler wheels 56 are capable of the angled and upward positioning relative to center idler wheels 54 and plane X at least in part due to the positioning of center idler wheels 54 and the resultant forces exerted onto rear suspension assembly 24.

Various forces are imparted onto and exerted by the components of rear suspension assembly 24 prior to and during operation of snowmobile 10, causing a resultant force to be imparted onto bracket 64, thereby maintaining rear idler wheel 56 at angle α relative to plane X. For example, a force is exerted onto rear idler wheels 56 as indicated by $F_R$ due to the rotation of and tension of endless track 20, and a force is exerted onto front idler wheels 52 as indicated by $F_F$ due to rotation of and tension of endless track 20. In embodiments, force $F_R$ has two components imparted by each lower run 27 and upper run 25. Additionally, force $F_R$ has a horizontal component (i.e., parallel to longitudinal axis L) and a vertical component (i.e., transverse to longitudinal axis L). The directionality of the forces $F_R$ define an angle beta (β) between the two vectors. Angle β changes as snowmobile 10 operates due to changes in the rider suspension height during movement. Additionally, during operation, a force is exerted onto center point 46 of each of plurality of carrier wheels 42 indicated by $F_P$ resulting from at least the operation of rear shock absorber 38. Further, incorporation of center idler wheels 54 causes a force $F_T$ exerted onto endless track 20, and thus the ground, by center idler wheels 54. In some embodiments, there may also be an outside biasing force that contributes to force $F_T$. For example, as previously described, a biasing element, such as spring 68 (FIG. 6) may impart a downward force or an upward force that contributes to the force $F_T$. As a result of force $F_T$, there is an opposing force $F_G$ exerted onto center idler wheels 54 by the ground. These forces may result in at least a moment $M_T$ imparted onto pivot point 72. While illustrated as a clockwise moment, the directionality of moment $M_T$ may vary. The resultant forces from the sum of the various forces and moment previously described, and primarily due to incorporation of forces $F_T$ and $F_G$, allow for biasing or maintaining rear idler wheels 56 at an angle relative to plane X through the force that is exerted onto first brackets 64 and second rear axle 62 of rear idler wheels 56.

In other words, the sum of these forces lead to an upward resultant idler tension line force extending upward from center idler wheels 54, a resultant force that is exerted from pivot point 72 of bracket 64, indicated by $F_A$ having both a vertical component (i.e., transverse to longitudinal axis L) and a horizontal component (i.e., parallel to longitudinal axis L), and a resultant force extending from second rear axle 62 indicated as force $F_L$, which may also have a horizontal component and a vertical component. Additionally, the sum of these forces and directionality of angle β resulting between forces $F_T$, result in an angle and magnitude of the resultant forces that contribute to the positioning of rear idler wheels 56. As the contributing forces within rear suspension assembly 24 are changed, angle α and angle β may vary. Various factors may contribute to variations in the above described forces, such as, but not limited to, the speed and direction at which snowmobile 10 is operating, the geometry and positioning of center idler wheels 54, the positioning of center idler wheels 54 relative to front idler wheels 52, and the geometry and configuration of first brackets 64.

For example, one of the factors that may affect the above described forces is the ratio between a length of first brackets 64 and a height of second rear axle 62 of rear idler wheels 56. More specifically, each of first brackets 64 has a length L1 defined by the length extending between second rear axle 62 of rear idler wheels 56 and pivot point 72 of first brackets 64. Varying length L1 of bracket 64 alters the resultant forces described above, and thus alters or affects angle α at which rear idler wheels 56 are positioned relative to plane X. As such, based on the desired angle α of rear idler wheels 56, there may be an optimal ratio of length L1 of bracket 64 and height H1 of rear idler wheels 56. For example, in various embodiments, a desired ratio of L1 to H1 has a value of between approximately 1:1 and approximately 4:1. In further embodiments, the desired ratio of L1 to H1 has a value of 2:1.

As previously disclosed, angle α may be varied prior to and/or during the use of snowmobile 10 and angle β may vary throughout operation of snowmobile 10. FIGS. 8 and 9 illustrate a side view from within snowmobile 10 of a portion of rear suspension assembly 24. In FIG. 8, a configuration of rear suspension assembly 24 is illustrated wherein rear idler wheels 56 are positioned at angle α relative to plane X. As illustrated, a lowermost portion of center idler wheels 54 is positioned at approximately the same vertical height as plane X, such that a tangent line from a lowermost portion or a lowermost point of center idler wheels 54 are parallel with plane X. However, as disclosed, angle α may be varied either prior to or during operation of snowmobile 10. For example, FIG. 9 illustrates rear suspension assembly 24 in a configuration wherein rear idler wheels 56 are positioned at an angle α' relative to plane X. In the configuration of FIG. 9, first brackets 64 have been rotated counterclockwise about pivot point 72 and vertically upwards in the configuration of FIG. 9 relative to the configuration of FIG. 8. More particularly, in FIG. 9, pin 74 is positioned against uppermost surface 78 of channel 70 which allows for rear idler wheels 56 to be positioned at angle α'; however, in FIG. 8, pin 74 is positioned against lowermost surface 76 of channel 70 which positions rear idler wheels 56 at angle α. In this way, channel 70 limits the upper and lower positions of rear idler wheels 56 and allow rear idler wheels 56 to move to angle α' when snowmobile 10 moved in reverse over an obstacle or pile of snow. Meanwhile, when snowmobile 10 is moving forwardly or rearwardly on generally flat terrain, rear idler wheels 56 may be biased or maintained at angle α (FIG. 8) because pin 74 is positioned against lowermost surface 76 of channel 70. In operation, first brackets 64, and thus center idler wheels 54 and rear idler wheels 56 may rotate clockwise back into the position wherein rear wheels 56 are positioned to angle α when operating in the forward direction or when no longer traversing snow or obstacles in reverse. Further, channel 70 may be altered to have a greater distance between lowermost surface 76 and uppermost surface 78 of channel 70 to increase the angular rotation possible of the first brackets 64. For example, in embodiments, channel 70 has lowermost surface 76 positioned such that when first brackets 64 rotate to clockwise about pivot point 72, center idler wheels 54 are positioned below plane X, similar to as shown in phantom in FIG. 3. Because channel 70 is an open channel that freely allows for movement of pin 74 between uppermost and lowermost surfaces 76, 78 thereof, center idler wheel 54 and, consequently, rear idler wheels 56 are able to move within the range of movement permitted by channel 70 when overcoming an obstacle or terrain as snowmobile 10 is moving in reverse. In this way, there is no need for manual adjustment of rear idler wheels 56 during a reverse operation of snowmobile 10.

As such, in FIG. 9, center idler wheels 54 are positioned at a vertical height above plane X. In other words, a bottommost portion of each center idler wheel 54 is positioned above plane X and a tangent line of lowermost portion of each center idler wheel 54 is angled relative to plane X. Rotation of first brackets 64, and thus center idler wheels 54 and rear idler wheels 56, contribute to angle α' having a value greater than angle α (FIG. 8). For example, angle α may have a value of approximately 9 degrees while angle α' may have a value of approximately 25 degrees. FIG. 8, for example, may represent snowmobile 10 in a configuration just prior to operating in reverse and over snow, while FIG. 9 may illustrate a configuration of snowmobile 10 after being operated in reverse and climbing over snow or an obstacle. In other embodiments, FIG. 9 illustrates a configuration of snowmobile 10 prior to use having a pre-disposed angle. The angle α, α' at which rear idler wheels 56 are maintained relative to plane X is possible due to the inclusion and position of center idler wheels 54 which provides the necessary location and magnitude of forces disclosed herein for maintain tension in track 20 and the vertical position of rear idler wheels 56.

Figure 8A:
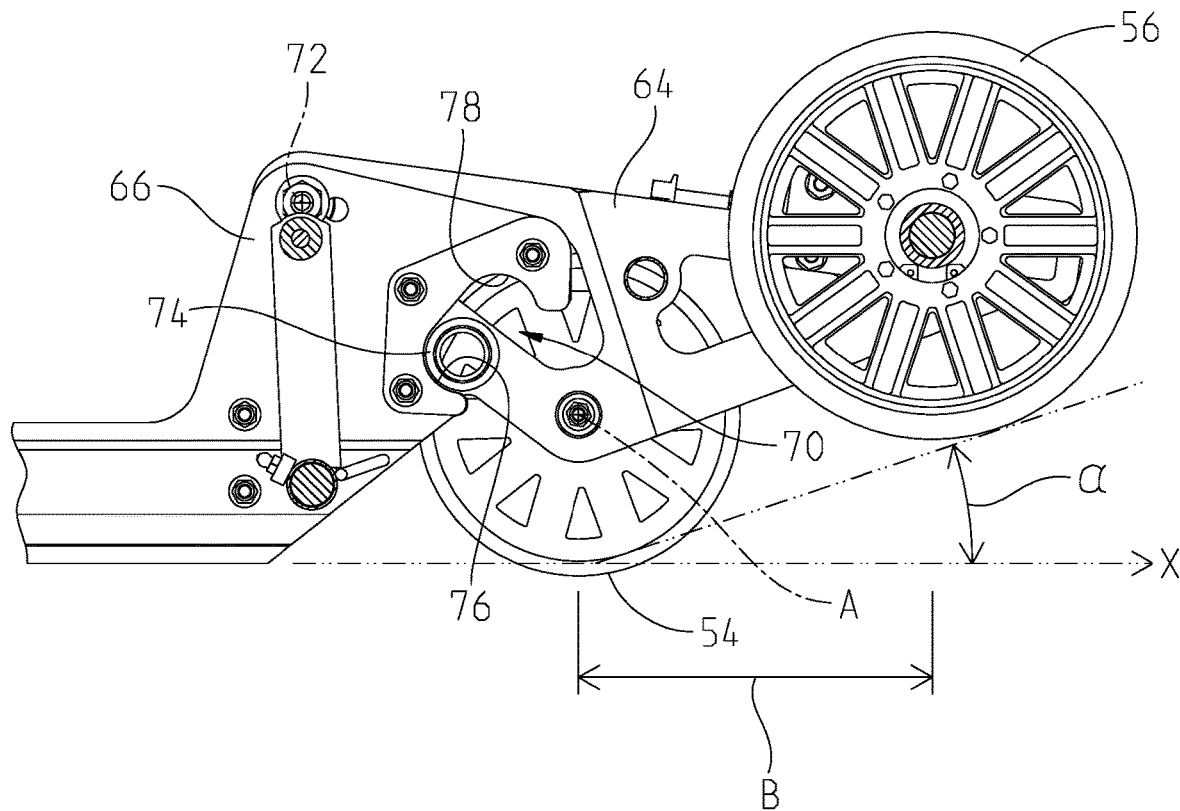
FIG. 8A is a left side view of an alternate embodiment of the right side of the rear suspension and showing an inner side of a portion of the right side of the rear suspension in the first configuration shown in FIG. 8.
Figure 9A:
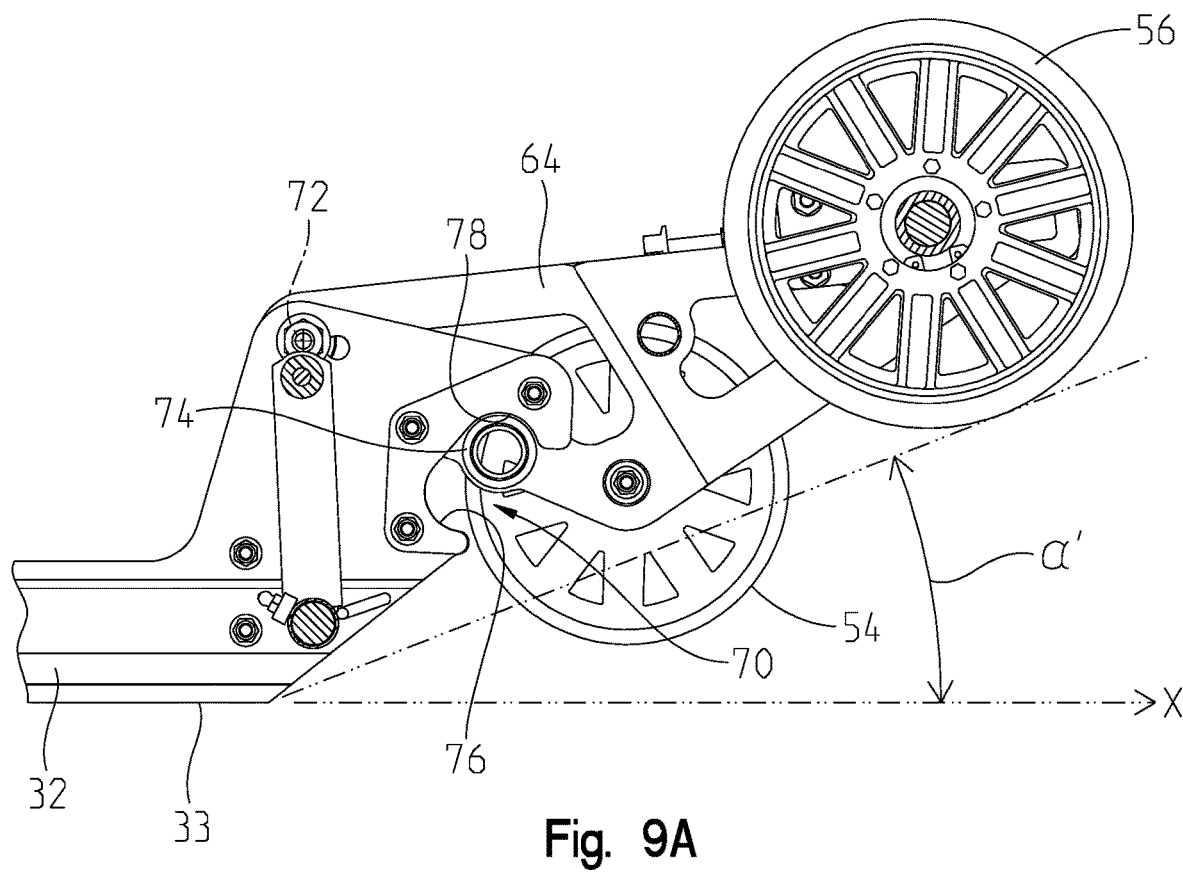
FIG. 9A is a left side view of the alternate embodiment of the rear suspension of FIG. 8A and showing the inner side of the right side of the rear suspension in the second configuration shown in FIG. 9.

FIGS. 8A and 9A illustrate the embodiments of FIGS. 8 and 9, respectively, wherein the plurality of rear idler wheels 50 does not include front idler wheels 52. Rather, as shown, the plurality of rear idler wheels 50 includes at least one center idler wheel 54 and at least one rear idler wheel 56. However, operation of rear suspension assembly 24 is similar to the operation as described above with reference to the embodiments of FIGS. 8 and 9. For example, FIG. 8A illustrates a side view from within snowmobile 10 of a portion of rear suspension assembly 24, and more specifically illustrates the first configuration of snowmobile 10 prior to operation in reverse and at angle α. As illustrated, center idler wheel 54 is positioned immediately adjacent rear idler wheel 56. More specifically, a center point A of each center idler wheel 54 may be spaced from second rear axle 62 of rear idler wheel 56 by a distance B having a value of approximately 155 mm. In other embodiments, distance B may have a value of between approximately 150 mm and approximately 160 mm. Additionally, center idler wheels 54 may be positioned such that the lowermost portion of each of the center idler wheels 54 has a vertical height approximately equal to a vertical height of plane X. This configuration and positioning of center idler wheels 54 is such that rear idler wheels 54 are positioned vertically above plane X and angled relative to plane X with angle α, similar to as shown in FIG. 8. As center idler wheels 54 are positioned adjacent rear idler wheels 56 and both center idler wheels 54 and rear idler wheels 56 are coupled to bracket 64, center idler wheels 54 may extend at least partially along angle α as well. Further, the coupling to bracket 64 maintains the ability for movement of bracket 64 to cause movement of center idler wheels 54 and rear idler wheels 56, as will be described further herein.

For example, FIG. 9A illustrates rear suspension assembly 24 in the second configuration of FIG. 9 wherein rear idler wheels 56 are positioned at angle α' relative to plane X. Similar to as described with reference to FIG. 9, the rotation of bracket 64 due to movement of snowmobile in reverse, and optionally over an obstacle, may cause bracket 64 to rotate counterclockwise. The coupling of center idler wheels 54 and rear idler wheels 56 to bracket 64 allows for the counterclockwise rotation of bracket 64 to result in counterclockwise rotation of center idler wheels 54 and rear idler wheels 56. In this way, the positioning of rear idler wheels 56 may transition from angle α relative to plane X to the positioning at angle α' relative to plane X. As previously described, the positioning of center idler wheels 54 relative to bracket 64 and rear idler wheels 56 allows for center idler wheels 54 to extend at least partially along angle α', as well.

As such, even without the incorporation of front idler wheels 52, angle α, α' at which rear idler wheels 56 are maintained relative to plane X is possible due to the inclusion and position of center idler wheels 54 which provides the necessary location and magnitude of forces disclosed herein for maintaining tension in track 20 and the vertical position of rear idler wheels 56.

Figure 10:
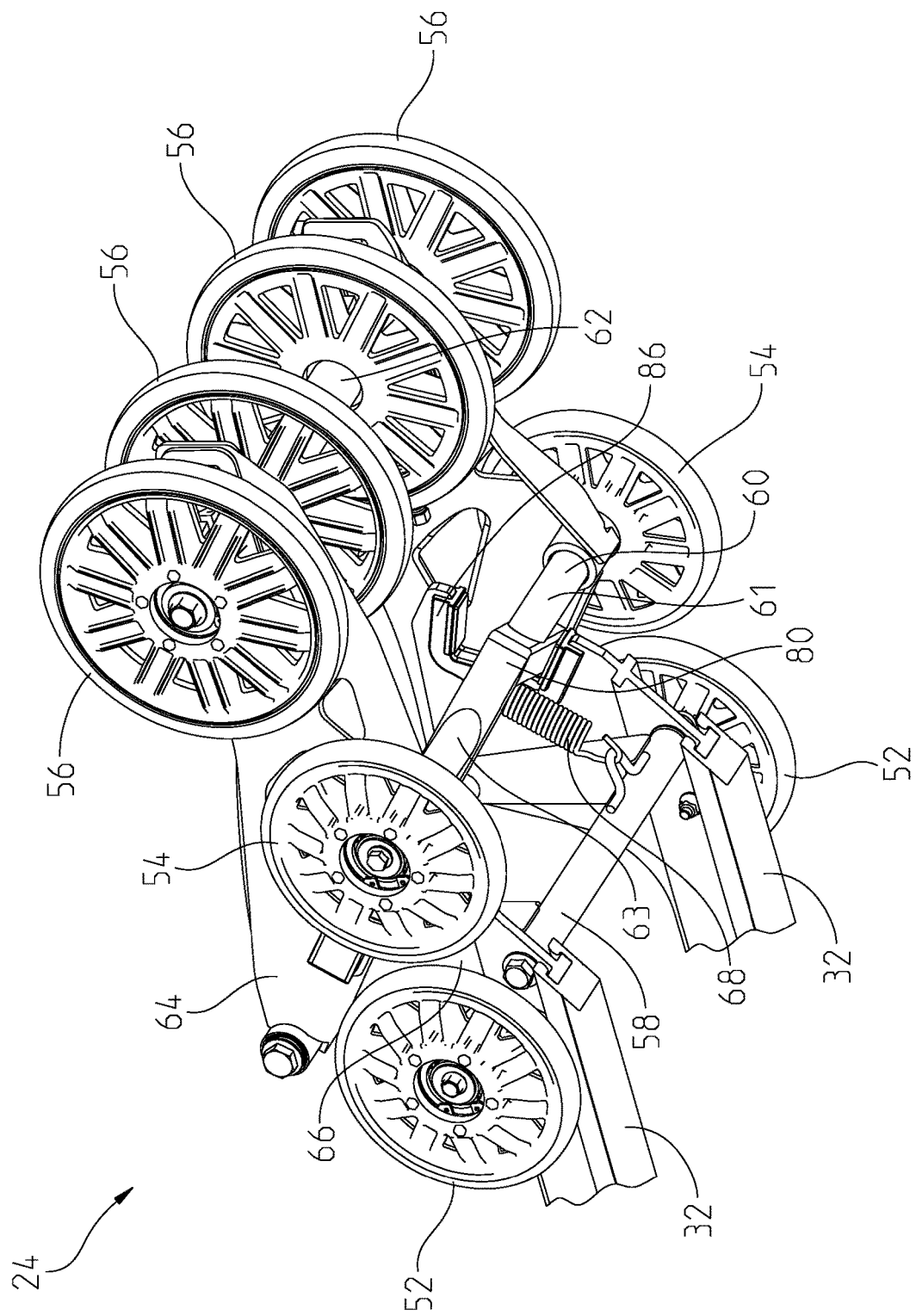
FIG. 10 is a left rear perspective view of a portion of a rear suspension of the snowmobile of FIG. 1.

With reference now to FIGS. 10-13, alternative embodiments of rear suspension assembly 24 for use with snowmobile 10 are illustrated. For example, FIG. 10 illustrated rear suspension assembly 24 having front idler wheels 52 coupled with one another through first axle 58, and rear idler wheels 56 and center idler wheels 54 coupled with first and second brackets 66, 64, respectively. However, rear suspension assembly 24 illustrated in FIG. 10 differs from that of FIGS. 6-8 in that pin 74 and channel 70 are omitted. Rather, rear suspension assembly 24 includes a crossbar 80 extending laterally between first brackets 64 for facilitating rotation of first brackets 64 and providing stop surfaces to define upper and lower limits of rotation of first brackets 64 as discussed herein. As illustrated in FIG. 10, crossbar 80 includes a first portion 82 coupled with one of second brackets 66 and a second portion 84 coupled with a second bracket of second brackets 66. Transverse tube 60 is modified (relative to transverse tube 60 of FIG. 6, for example) to have a first portion 61 coupled with one of brackets 66 and crossbar 80, illustratively first portion 82 of crossbar 80, and a second portion 63 coupled with a second one of brackets 66 and crossbar 80, illustratively second portion 84 of crossbar 80.

As illustrated, second brackets 66 each includes at least one plate 86 mounted onto an inner side of the respective second brackets 66. Plate 86 includes a first leg portion 88 and a second leg portion 90 which are arranged to define an opening 92 configured for receiving at least a portion of first portion 82 of crossbar 80. While FIG. 11 only illustrates one plate 86 on an inner side of one of second brackets 66, rear suspension assembly 24 additionally includes a second plate (not shown) opposing plate 86 and received on an inner side of a left portion of second brackets 66 for receiving second portion 84 of crossbar 80.

Figure 11:
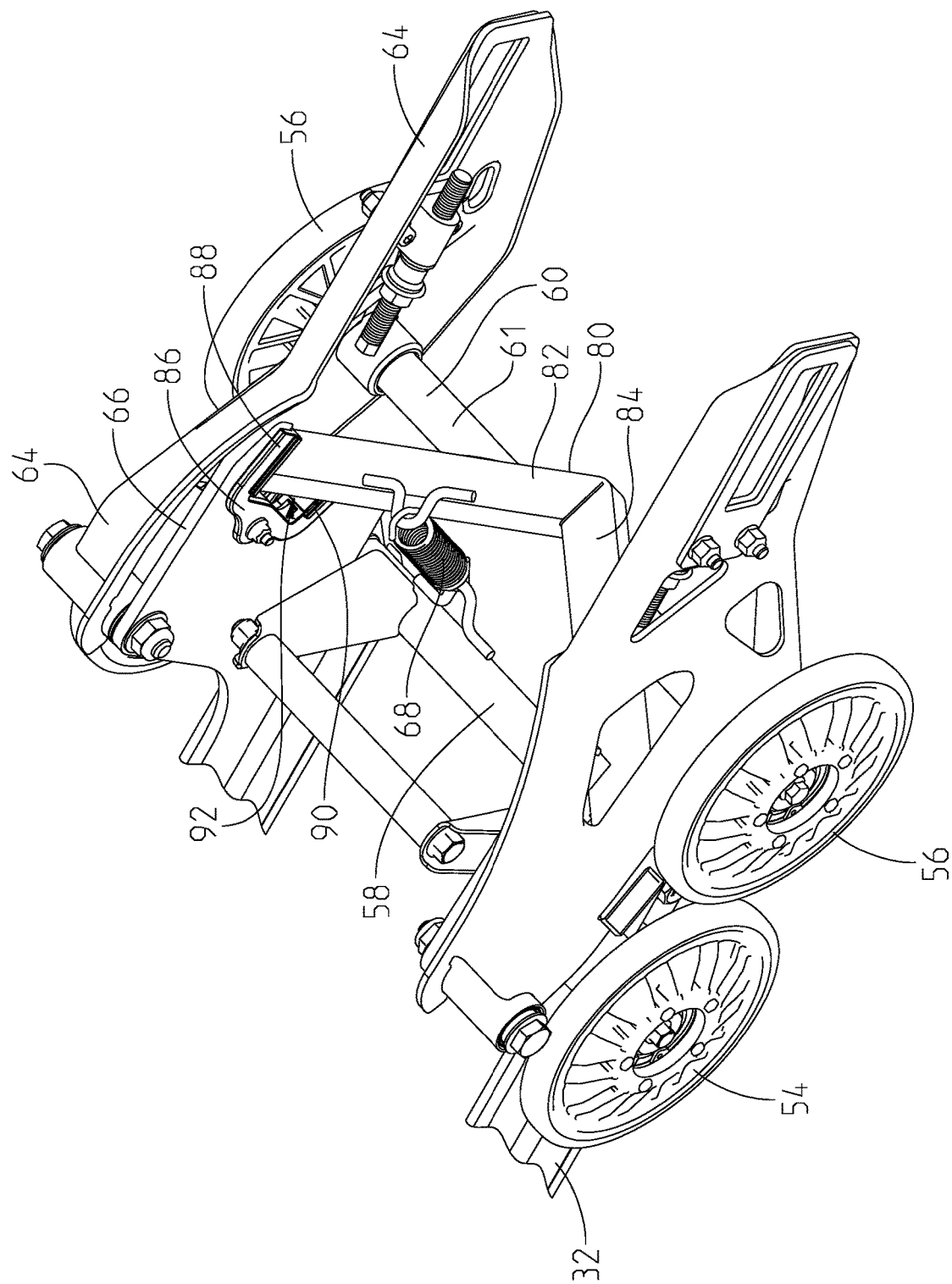
FIG. 11 is a left top perspective view of a portion of the rear suspension of FIG. 10.

With continued reference to FIGS. 10-11, first leg portion 88 and second leg portion 90 act as stop surfaces of the at least one plate 86 such that upon rotation of first brackets 64, crossbar 80 rotates with first brackets 64 within opening 92 of plate 86 defined between first leg portion 88 and second leg portion 90. In other words, first leg portion 88 acts as an upper limit of rotation of crossbar 80 such that when rear wheels 56 are at an uppermost position (i.e., a maximum angle α), crossbar 80 is in contact with first leg portion 88. Second leg portion 90 acts as a lower limit of the rotation of crossbar 80 during operation of snowmobile 10, such that once rear wheels 56 are at a lowermost position (i.e., a minimum angle α), crossbar 80 is in contact with second leg portion 90. First leg portion 88 and second leg portion 90 may include portions formed from rubber, plastic, or various other materials that protect crossbar 80 and plate 86 during contact with one another.

Figure 12:
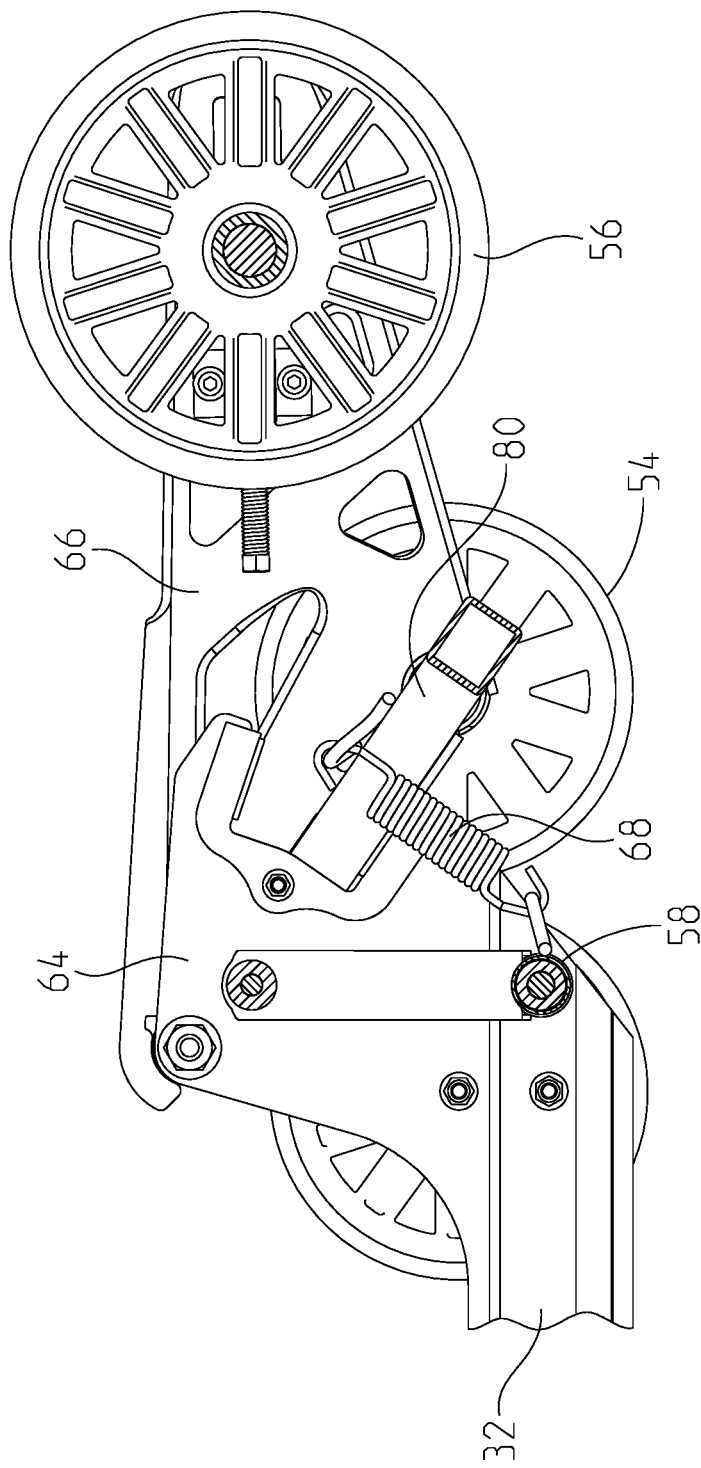
FIG. 12 is a left side sectional view along a centerline of the rear suspension to illustrate the right side of the rear suspension of FIG. 10.

FIG. 12 illustrates a side view of an inner portion of right side of rear suspension assembly 24 of FIGS. 10 and 11. As illustrated, crossbar 80 may be coupled with spring 68 such that spring 68 may still exert a downward biasing force onto first brackets 64, and thus, onto at least center rear idlers 54.

Figure 13:
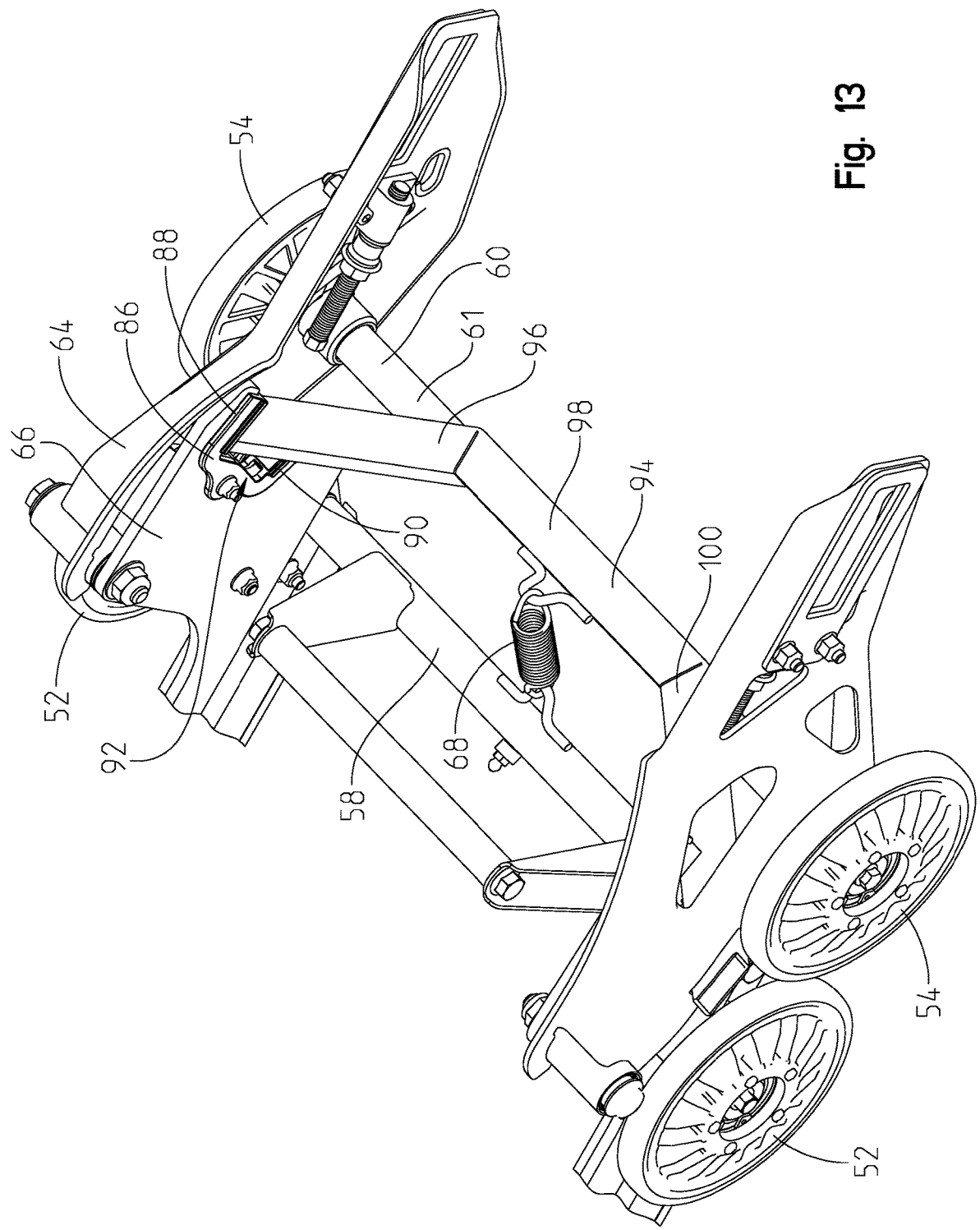
FIG. 13 is a left rear perspective view of a portion of a rear suspension of the snowmobile of FIG. 1.

Further, with reference still to FIGS. 10-12, first and second portions 82, 84 of crossbar 80 define a generally triangular configuration and crossbar 80 is defined by a generally rectangular cross section; however, various other shapes and configurations may be incorporated. For example, FIG. 13 illustrates a further variation of rear suspension assembly 24 including a modified crossbar 94 having a first portion 96, a second portion 98, and a third portion 100. As illustrated, first portion 96 and third portion 100 are coupled with first brackets 64 and extend through the at least one plate 86 of second brackets 66. First portion 96 and third portion 100 are each angled longitudinally rearward and are coupled to second portion 98, which extends generally horizontally and between first and third portions 96, 100. As illustrated, crossbar 94 also includes a generally rectangular cross-section. However, either of crossbar 80 or crossbar 94 may be defined by a circular, triangular, square, or any other applicable shaped cross-section. In further embodiments, other configurations of the various portions of crossbar 80, 94 may be incorporated and the above configurations are provided merely as examples. Crossbars 80, 94 may provide for another mechanism of facilitating rotation of first brackets 64 and thus rear idler wheels 56, while providing uppermost and lowermost stops to avoid over rotation of rear idler wheels 56.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snowmobile extending along a longitudinal axis, the snowmobile comprising:
   a frame;
   a powertrain coupled to the frame;
   a track operatively coupled to the powertrain for propelling the snowmobile on a ground surface, the track having an upper run and a lower run; and
   a rear suspension positioned generally within the track, the rear suspension comprising:
      at least one slide rail defining a plane,
      at least one front idler wheel in contact with the lower run of the track, the at least one front idler wheel longitudinally positioned such that at least a portion of the at least one front idler wheel is at or rearwards of a rear end of the at least one slide rail,
      at least one center idler wheel positioned rearwards of the at least one front idler wheel and in contact with the lower run of the track, and
      at least one rear idler wheel positioned rearwards of the at least one center idler wheel and in contact with the lower run of the track such the at least one center idler wheel is positioned longitudinally between the at least one front idler wheel and the at least one rear idler wheel, wherein the positioning of the at least one center idler wheel is configured such that the at least one rear idler wheel is positioned at an angle relative to the plane having a value that is greater than zero.

2. The snowmobile of claim 1, wherein the at least one front idler wheel and the at least one center idler wheel are positioned directly above the plane and at an angle relative to the plane having a value of zero.

3. The snowmobile of claim 1, wherein a portion of the track is in direct contact with the ground surface, and the center idler wheel and front idler wheel are positioned in contact with the portion of the track in contact with the ground surface.

4. The snowmobile of claim 1, wherein at least a portion of the center idler wheel is positioned at a vertical height that is below a vertical height of the plane of the snowmobile.

5. The snowmobile of claim 1, wherein the angle of the rear idler wheel relative to the plane ranges between 5 degrees and 50 degrees.

6. The snowmobile of claim 1, wherein the angle of the rear idler wheel relative to the plane is variable during operation of the snowmobile.

7. The snowmobile of claim 1, wherein the rear suspension assembly further comprises a first bracket and a second bracket operably coupled to the first bracket, and wherein the rear idler wheel and the center idler wheel are coupled the first bracket and the front idler wheel is coupled to the second bracket.

8. The snowmobile of claim 7, wherein the first bracket is configured for rotation about a pivot point through an angle of rotation configured to rotate the rear idler wheel upwards or downwards.

9. The snowmobile of claim 8, wherein an upper limit of the angle of rotation of the first bracket is defined by the positioning of a tunnel of the frame.

10. The snowmobile of claim 8, wherein a lower limit of the angle of rotation of the first bracket is defined by a longitudinal distance between the at least one center idler wheel and the at least one front idler wheel.

11. The snowmobile of claim 8, wherein the second bracket comprises a channel and the first bracket comprises a pin that is received in the channel such that the pin is able to move within the channel to allow the first bracket to rotate through the angle of rotation.

12. The snowmobile of claim 7, wherein the rear suspension assembly further comprises a biasing member that exerts a biasing force onto the at least the first bracket.

13. A snowmobile extending along a longitudinal axis, the snowmobile comprising:
   a frame;
   a powertrain coupled to the frame;
   a track operatively coupled to the powertrain for propelling the snowmobile on a ground surface; and a rear suspension positioned generally within the track, the rear suspension comprising:
at least one slide rail defining a plane,
at least one front idler wheel, the at least one front idler wheel longitudinally positioned such that at least a portion of the at least one front idler wheel is at at or rearwards of a rear end of the at least one slide rail,
at least one center idler wheel positioned longitudinally rearward relative to the at least one front idler wheel, and
at least one rear idler wheel positioned longitudinally rearward of the at least one center idler wheel, wherein the at least one center idler wheel includes at least a portion positioned at a vertical height below a vertical height of the plane.

14. The snowmobile of claim 13, wherein a lowermost portion of the front idler wheel is positioned in contact with the track and at a vertical height approximately equal to the vertical height of the plane.

15. The snowmobile of claim 13, wherein a lowermost portion of the rear idler wheel is positioned at a vertical height greater than a vertical height of the plane and positioned at an angle relative to the plane.

16. The snowmobile of claim 15, wherein the angle ranges between approximately 5 degrees and approximately 50 degrees.

17. The snowmobile of claim 13, wherein the rear suspension assembly comprises a first bracket and a second bracket operably coupled to the first bracket, the center idler wheel and the rear idler wheel coupled to the first bracket and the front idler wheel coupled to the second bracket.

18. A rear suspension assembly for use with a snowmobile, the snowmobile having an endless track and positioned around the rear suspension assembly, the rear suspension assembly comprising:
at least one slide rail defining a plane;
a first bracket operably coupled to a second bracket;
at least one front idler wheel coupled to the second bracket, the at least one front idler wheel longitudinally positioned such that at least a portion of the at least one front idler wheel is at at or rearwards of a rear end of the at least one slide rail;
at least one center idler wheel coupled to the first bracket and positioned longitudinally rearward of the at least one idler wheel;
at least one rear idler wheel coupled to the first bracket and positioned longitudinally rearward of the at least one center idler wheel; and
wherein the first bracket is rotatably coupled to the second bracket, such that the first bracket can rotate clockwise and counter clockwise relative to the second bracket through an angle of rotation defined by an uppermost limit and a lowermost limit; and wherein the at least one center idler wheel and the at least one rear idler wheel rotate with the first bracket due to the coupling of the center idler wheel and the rear idler wheel to the first bracket.

19. The rear suspension assembly of claim 18, wherein the configuration of the at least one center idler wheel allows for the at least one rear idler wheel to be positioned angled relative to the plane at an angle greater than zero.

20. The rear suspension assembly of claim 18, wherein at least a portion of the at least one center idler wheel is positioned vertically below the plane.

21. The rear suspension assembly of claim 18, wherein the angle of the at least one rear idler wheel relative to the plane is variable during operation of the snowmobile due to the first bracket rotating clockwise and counterclockwise.

22. A snowmobile extending along a longitudinal axis, the snowmobile comprising:
a frame;
a powertrain coupled to the frame;
a track operatively coupled to the powertrain for propelling the snowmobile on a ground surface, the track having an upper run and a lower run; and
a rear suspension positioned generally within the track, the rear suspension comprising:
at least one slide rail defining a plane,
at least one front idler wheel in contact with the lower run of the track, the at least one front idler wheel longitudinally positioned such that at least a portion of the at least one front idler wheel is at at or rearwards of a rear end of the at least one slide rail,
at least one center idler wheel positioned rearwards of the at least one front idler wheel and in contact with the lower run of the track, and
at least one rear idler wheel positioned rearwards of the at least one center idler wheel, wherein the at least one rear idler wheel is coupled with a rear axle; and
wherein the at least one rear idler wheel has a diameter and a height is defined as the height extending between the rear axle and a lowermost surface of the lower run of the track, and wherein the height has a value of at least the diameter of the at least one rear idler wheel.

23. The snowmobile of claim 22, wherein the height has a value of two times the diameter of the at least one rear idler wheel.

24. The snowmobile of claim 22, wherein the at least one center idler wheel is positioned at an angle relative to the plane that has a value of less than zero.

25. A snowmobile extending along a longitudinal axis, the snowmobile comprising:
a frame;
a powertrain coupled to the frame;
a track operatively coupled to the powertrain for propelling the snowmobile on a ground surface, the track having an upper run and a lower run; and
a rear suspension positioned generally within the track, the rear suspension comprising:
at least one slide rail defining a plane,
at least one center idler wheel positioned in contact with the lower run of the track,
a bracket operatively coupled to the at least one center idler wheel, and
at least one rear idler wheel positioned rearward of the at least one center idler wheel, in contact with the lower run of the track, and operatively coupled to the bracket such that the center idler wheel and the rear idler wheel rotate with the bracket, wherein the center idler wheel is positioned adjacent the at least one rear idler wheel and the positioning of the at least one center idler wheel is configured such that the at least one rear idler wheel is positioned at an angle relative to the plane having a value that is greater than zero.

* * * * *